United States Patent [19]

Siraky

[11] Patent Number: 5,686,804
[45] Date of Patent: Nov. 11, 1997

[54] SYSTEM FOR MEASURING THE ANGLE OF ROTATION

[75] Inventor: Josef Siraky, Donaueschingen, Germany

[73] Assignee: Max Stegmann GmbH, Donaueschingen, Germany

[21] Appl. No.: 601,117

[22] Filed: Feb. 14, 1996

[30] Foreign Application Priority Data

Apr. 11, 1995 [DE] Germany .................. 195 13 692.6

[51] Int. Cl.⁶ .................................................. G01D 5/245
[52] U.S. Cl. ........................... 318/640; 318/592; 318/602
[58] Field of Search ............................... 318/592, 600, 318/601, 602, 604, 605, 661, 138, 254, 439, 640, 594

[56] References Cited

U.S. PATENT DOCUMENTS

| | | | |
|---|---|---|---|
| 4,429,262 | 1/1984 | Utenick | 318/254 |
| 5,103,225 | 4/1992 | Dolan et al. | 318/439 X |
| 5,140,240 | 8/1992 | Okutani | 318/608 |
| 5,394,102 | 2/1995 | Mori et al. | 324/772 |

FOREIGN PATENT DOCUMENTS 42 20 502  12/1993  Germany .

OTHER PUBLICATIONS

NTIS Tech Notes, 1 Feb. 1990, Springfield, Virginia, USA, Seite 161 XP000103872: "Rapidly–Indexing Incremental–Angle Encoder" by P.R. Christon et al.

*Primary Examiner*—Bentsu Ro
*Attorney, Agent, or Firm*—Gary M. Nath; Nath & Associates

[57] ABSTRACT

A system for measuring the angle of rotation in order to determine the absolute angular position of the shaft of an electromotor is described which consists of a device for measuring the angle of rotation (10) and a control unit (11) connected to one another via an electric interface. The electric interface comprises an analog process data channel (8) and a digital parameter channel (9). The control unit (11) controls a change-over switch (7) of the process data channel (8) via the digital parameter channel (9). As a result thereof, a sine-cosine signal pair with one period for revolution is supplied via the process data channel (8) to the control unit (11) in order to determine the absolute angular position for the starting of the motor. Then, a sine-cosine signal pair with a high number of periods per revolution is supplied via the process data channel (8) in order to incrementally count the angle of rotation. An accurate correction of the incrementally counted angle takes place by means of a synchronizing signal generated by an index mark (15) and supplied via the parameter channel (9) to the control unit (11).

5 Claims, 1 Drawing Sheet

SYSTEM FOR MEASURING THE ANGLE OF ROTATION

BACKGROUND OF THE INVENTION

The invention pertains to a system for measuring the angle of rotation in order to determine the absolute angular position of the shaft of an electromotor.

In order to make precise angular positioning and synchronization possible in servomotors or other electromotor drives the angular position and the speed of the shaft of the electromotor must be precisely controlled. Regulating systems are used for this in which a device for measuring the angle of rotation supplies the angle information for determining the absolute angular position and the speed.

In this connection, DE 42 20 502 WP teaches a system for measuring the angle of rotation of the initially cited type. In this system for measuring the angle of rotation the device for measuring the angle of rotation supplies several sine-cosine signal pairs whose frequencies (periodicities) per revolution of the shaft are integral multiples of each other. The device for measuring the angle of rotation passes the sine-cosine signal pair with the highest number of periods per revolution via an analog process data channel to a control unit in order to obtain an incremental measured angle quantity with a high resolution. The particular instantaneous angular position is formed from the sine-cosine signal pairs with the differing frequencies in the device for measuring the angle of rotation with high accuracy as a digital value which is transferred via a digital parameter channel to the control unit. When the system is cut in the absolute value of the angular position is supplied via the parameter channel to the control unit, which then, starting from this absolute value, counts the angular position further incrementally in accordance with the sine-cosine signal of the process data channel. The incremental signal of the process data channel also serves to determine the speed.

This known system for measuring the angle of rotation immediately supplies the absolute angular position with high accuracy when cut in. However, a certain expense is necessary for this in order to form the digital value of the absolute angular position from the sine-cosine signal pairs with differing frequencies.

Furthermore, a system for measuring the angle of rotation (rotation indicator ("shaft encoder") ERN of the Dr. Johannes Heidenhain GmbH company) is known in which the device for measuring the angle of rotation transfers a sine-cosine signal pair with a high number of periods per revolution as an incremental measured angle quantity via an analog process data channel. In another analog channel a sine-cosine signal pair with only one period per revolution is transferred to the control unit. The absolute angular position is determined with low accuracy from this sine-cosine signal pair; however, the accuracy of the absolute angular position is sufficient to drive the electromotor in-phase for start. Finally, the device for measuring the angle of rotation comprises an index mark which represents an absolute reference angle value. If the index mark is reached during the rotation, a synchronizing signal is put on the control unit by means of which signal the absolute angular value with low accuracy is corrected to an absolute angular value with high accuracy for the further incremental counting.

This system for measuring the angle of rotation requires an interface (point of intersection) with a rather large number of transfer channels and therewith a rather high susceptibility to trouble (interference). Moreover, the interface is not compatible with the interface of the device for measuring the angle of rotation of the generic system for measuring the angle of rotation.

SUMMARY OF THE INVENTION

The invention addresses the problem of creating a system for measuring the angle of rotation which is simple and economical to construct and comprises a simple interface which is preferably physically compatible with the generic system for measuring the angle of rotation.

The invention uses a device for measuring the angle of rotation which supplies in the first place a sine-cosine signal pair with a high number of periods per revolution as high-resolution, incremental angular value, in the second place a sine-cosine signal pair with one or a few periods per revolution for determining a coarse absolute angular value for the starting commutation of the electromotor and in the third place a synchronizing signal associated with the one of the few periods of this sine-cosine signal pair as an absolute angular value with a high degree of accuracy. In order to be able to form the interface between the device for measuring the angle of rotation and the control unit in a simple manner with only one analog process data channel and one digital parameter channel, the sine-cosine signal pair is at first connected to the analog process data channel via the digital parameter channel when the control unit is cut in in order to determine the coarse absolute angular position. As a result thereof the absolute angular position of the motor shaft can be determined with an accuracy sufficient for the starting commutation of the motor. After the motor has started, the high-resolution sine-cosine signal pair is connected by the control unit via the digital parameter channel onto the analog process data channel so that the angle of rotation passed through by the shaft can be counted incrementally with high resolution. If the index mark of the device for measuring the angle of rotation is reached during the rotation of the motor the device for measuring the angle of rotation puts a synchronizing signal via the digital parameter channel on the control unit which signal makes available the absolute angular value of the index mark with a high degree of accuracy in order to correct the initial value for the incremental measuring of the angle of rotation.

The system for measuring the angle of rotation offers the advantage that a control unit with a simple interface comprising an analog process data channel and a digital parameter channel can be used like that used e.g. in the case of the system for measuring the angle of rotation according to DE 42 20 502 C1. The adaptation to the device for measuring the angle of rotation of the system of the invention takes place exclusively via the software programming of the control unit. The device for measuring the angle of rotation is economical since a synchronization by means of index marks is used for determining the absolute angular position with a high degree of accuracy.

BRIEF DESCRIPTION OF THE DRAWING

The invention is explained in detail in the following making use of an exemplary embodiment shown in FIG. 1. The single figure shows the system for measuring the angle of rotation in schematic fashion.

DETAILED DESCRIPTION OF THE PREFERRED EMBODIMENT

Figure 1:
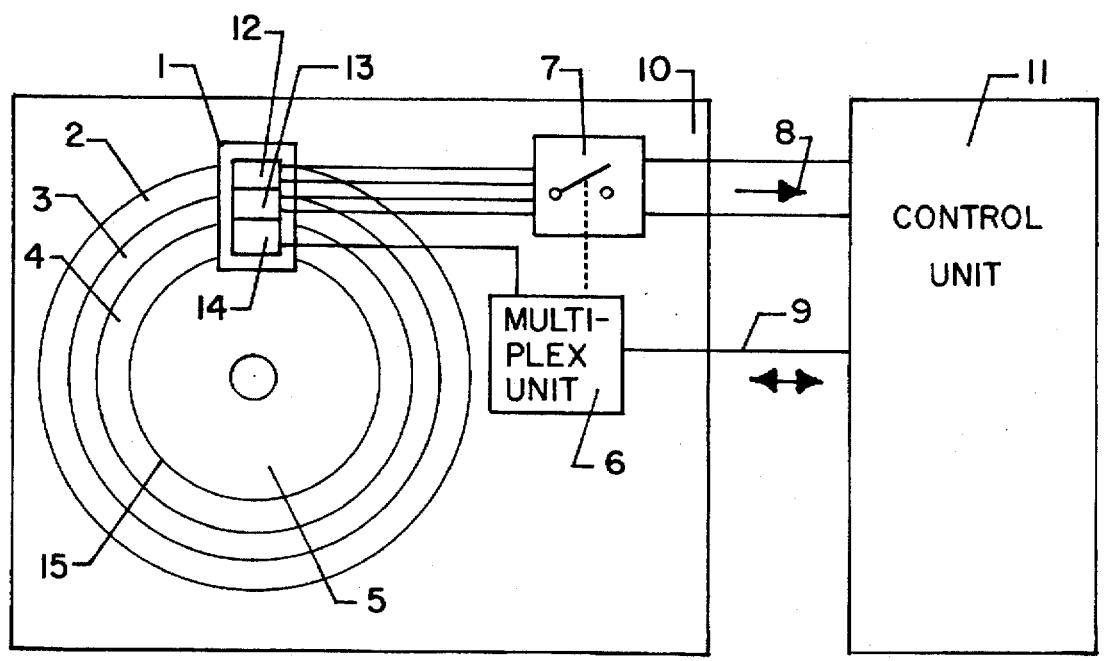

The system for measuring the angle of rotation consists of a device for measuring the angle of rotation 10 and a control unit 11. Device for measuring the angle of rotation 10 and control unit 11 are connected to one another via an electric interface comprising process data channel 8 as analog output of device for measuring the angle of rotation 10 and comprising parameter channel 9 as digital output and input of device for measuring the angle of rotation 10.

Device for measuring the angle of rotation 10 comprises material measures on a disk 5 which is coupled directly or via a transmission to the shaft of an electromotor whose angular position and speed is to be regulated in a program-controlled manner.

Disk 5 carries tracks 2, 3 and 4 which are preferably optically scannable and are scanned by appropriate opto-electronic transducers 12, 13 and 14 of scanning unit 1. The scanning of track 2 yields a high-resolution, incremental angle information in the form of a sine-cosine signal pair with a high number of periods per revolution of disk 5. The scanning of track 3 yields a sine-cosine signal pair with a single period per revolution of disk 5. Track 4 has only one index mark 15 in a given angular position whose dimension in the circumferential direction is smaller than the period (cycle duration) of track 2.

The sine-cosine signal pairs of tracks 2, 3 are connected via change-over switch 7 alternatively to process data channel 8 and transferred to control unit 11. The synchronizing signal of track 4 is fed via multiplex unit 6 and parameter channel 9 to control unit 11. In the inverse direction change-over signals are fed from control unit 11 via parameter channel 9 and multiplex unit 6 to change-over switch 7 which signals actuate this change-over switch 7.

The system for measuring the angle of rotation functions as a revertive system for the control of the servomotor in the following manner:

When the system is cut in, control unit 11 connects change-over switch 7 via parameter channel 9 and multiplex unit 6 in such a manner that the sine-cosine signal pair is transferred with one period per revolution of track 3 via process data channel 8 in an analog manner to control unit 11. Control unit 11 determines the absolute angular position of disk 5 and therewith of the motor shaft from the sine signal and the cosine signal with one period per revolution. The accuracy of this absolute angular position is not very high but sufficient to supply the motor windings in-phase with current for starting the motor.

After this coarse determination of the absolute angular position, control unit 11 again connects change-over switch 7 in such a manner via parameter channel 9 and multiplex unit 6 that the sine-cosine signal pair with the high number of periods per revolution of track 2 is connected to process data channel 8 and is transferred in an analog manner to control unit 11. Control unit 11 counts the angle of rotation incrementally in accordance with this sine-cosine signal pair. The analog transfer of the sine-cosine signals makes possible a transfer channel with relatively low bandwidth. A voltage discrimination of the sine-cosine signals in control unit 11 additionally makes possible a further fine subdivision of the sine-cosine periods and therewith a further elevation of the angular resolution. The use of sine-cosine signals makes possible a simple discrimination of the direction of rotation. The incremental angle information serves for the determination of speed as actual value (feedback value) for the regulating of the motor speed. The angular position is determined by incremental counting of the angle of rotation from the initially coarsely determined absolute angular position.

As soon as index mark 15 of track 4 reaches scanning unit 1 during the rotation of disk 5, opto-electronic transducer 14 passes a synchronizing signal via multiplex unit 6 and digital parameter channel 9 to control unit 11. The angular resolution of the synchronizing signal of index mark 15 is less than the period of the sine-cosine signal pair of high-resolution track 2, so that the absolute angular position given by index mark 15 can be unambiguously associated with a period of the sine-cosine signal pair of track 2. Control unit 11 corrects in this manner the angular value incrementally counted at first form the absolute angular position, which was initially imprecisely determined, to an angular value with a high degree of accuracy achieved by means of high-resolution track 2 which angular value is absolute relative to index mark 15.

In addition to the change-over signals for change-over switch 7 and to the synchronizing signal of index mark 15 other information such as motor-winding temperatures, characteristic motor data and logistic information can be read via digital parameter channel 9 and stored.

In the described embodiment with a sine-cosine signal pair with one period per revolution in track 3 and with index mark 15 in track 4 the synchronizing of the absolute angular value during starting takes place at the latest after one revolution of disk 5. If the electromotor has more than one pole pair, track 3 can also correspondingly generate several periods of the sine-cosine signal pair per revolution, in which instance track 4 also has a number of index marks 15 corresponding to this number of periods. Finally, if there is a rather large number of pole pairs of the electromotor, the number of periods per revolution of the sine-cosine signal pair of track 3 and the corresponding number of index marks 15 of track 4 can correspond to an integral divider of the number of pole pairs of the motor. In every case an absolute determination of the angular position during starting is possible with sufficient accuracy for the commutation of the motor and for a subsequent correction of this coarse, absolute angular value by index marks 15.

I claim:

1. A method for measuring the angle of rotation in order to determine the absolute angular position of the shaft of an electromotor, with a device for measuring the angle of rotation which is connected via an electric interface to a control unit, which device for measuring the angle of rotation transmits a sine-cosine signal pair dependent on the angle of rotation with a high number of periods per revolution via an analog process data channel of the interface to the control unit for the motor control and in which a signal reproducing a reference angular position with a high degree of accuracy is transferred via a digital parameter channel of the interface from the device for measuring the angle of rotation to the control unit and further information is transferred via said digital parameter channel in both directions between the device for measuring the angle of rotation and the control unit, the method comprising the steps of:

initially determining an absolute angular position with a degree of accuracy sufficient for the starting commutation of the electromotor by using a sine-cosine signal pair with a number of periods per revolution corresponding at most to the number of pole pairs of the electromotor;

determining a more accurate angular position using a sine-cosine signal pair with a high number of periods per revolution of the shaft of the electromotor;

correcting the more absolute angular position using a synchronizing signal generated by using index marks which indicate an absolute angle of rotation of the shaft of the electromotor whose number corresponds to the number of periods of the sine-cosine signal pair for the initial determination of the absolute angular position.

2. The method for measuring the angle of rotation according to claim 1, wherein the sine-cosine signal pair for the initial determination of the absolute angular position has one period per revolution.

3. The method for measuring the angle of rotation according to claim 1, wherein the number of periods per revolution of the sine-cosine signal pair for the initial determination of the absolute angular position corresponds to an integral divider of the number of pole pairs of the electromotor.

4. A system for measuring the angle of rotation of the shaft of an electromotor, the system comprising:

means for initially determining an absolute angular position of the shaft with a degree of accuracy sufficient for the starting commutation of the electromotor by using a sine-cosine signal pair with a number of periods per revolution corresponding at most to the number of pole pairs of the electromotor;

means for generating a sine-cosine signal pair dependent on the angle of rotation of the shaft with a high number of periods per revolution of the shaft;

means for generating a synchronizing signal by using index marks which indicate an absolute angle of rotation of the shaft of the electromotor whose number corresponds to the number of periods of the sine-cosine signal pair for the initial determination of the absolute angular position; and means for determining a more accurate angular position of the shaft using the sine-cosine signal pair with the high number of periods per revolution of the shaft and the synchronizing signal.

5. The system for measuring the angle of rotation according to claim 4, wherein the system further includes a multiplex unit via which the synchronizing signal is supplied to the means for determining a more accurate angular position of the shaft and via which the change-over between the sine,cosine signal pair with a number of periods per revolution corresponding at most to the number of pole pairs of the electromotor and the sine-cosine signal pair with the high number of periods per revolution of the shaft is accomplished.

* * * * *